(12) United States Patent
Chou

(10) Patent No.: US 9,777,145 B2
(45) Date of Patent: *Oct. 3, 2017

(54) ANTI-FOGGING FILMS BASED ON ETHYLENE COPOLYMER COMPOSITIONS

(71) Applicant: E I DU PONT DE NEMOURS AND COMPANY, Wilmington, DE (US)

(72) Inventor: Richard T Chou, Hockessin, DE (US)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 338 days.

This patent is subject to a terminal disclaimer.

(21) Appl. No.: 14/575,157

(22) Filed: Dec. 18, 2014

(65) Prior Publication Data

US 2015/0175796 A1 Jun. 25, 2015

Related U.S. Application Data

(60) Provisional application No. 61/918,711, filed on Dec. 20, 2013.

(51) Int. Cl.
| | | |
|---|---|---|
| C08L 71/00 | (2006.01) | |
| C08L 23/06 | (2006.01) | |
| C08L 51/00 | (2006.01) | |
| C08L 23/08 | (2006.01) | |

(52) U.S. Cl.
CPC ......... *C08L 51/003* (2013.01); *C08L 23/0869* (2013.01); *Y10T 428/31721* (2015.04); *Y10T 428/31935* (2015.04)

(58) Field of Classification Search
None
See application file for complete search history.

(56) References Cited

U.S. PATENT DOCUMENTS

| | | |
|---|---|---|
| 2,462,331 A | 2/1949 | Myers |
| 2,897,183 A | 7/1959 | Christl et al. |
| 3,048,263 A | 8/1962 | Sacks et al. |
| 3,048,266 A | 8/1962 | Sacks et al. |
| 3,278,663 A | 10/1966 | Graham |
| 3,337,665 A | 8/1967 | Underwood et al. |
| 3,350,372 A | 10/1967 | Anspon et al. |
| 3,456,044 A | 7/1969 | Pahlke |
| 3,562,235 A | 2/1971 | Ryan |
| 3,756,996 A | 9/1973 | Pugh et al. |
| 3,812,205 A | 5/1974 | Dunkelberger |
| 3,843,753 A | 10/1974 | Owens |
| 3,972,961 A | 8/1976 | Hammer et al. |
| 4,141,935 A | 2/1979 | Dunkelberger |
| 4,189,420 A | 2/1980 | Sugimoto et al. |
| RE30,754 E | 9/1981 | Hammer et al. |
| 4,351,931 A | 9/1982 | Armitage |
| 4,486,552 A | 12/1984 | Niemann |
| 4,590,106 A | 5/1986 | Hsu et al. |
| 4,663,213 A | 5/1987 | Bailey et al. |
| 4,760,116 A | 7/1988 | Roberts |
| 4,769,421 A | 9/1988 | Hwo |
| 4,797,235 A | 1/1989 | Garland et al. |
| 4,886,634 A | 12/1989 | Strutzel et al. |
| 5,001,015 A | 3/1991 | Havens |
| 5,028,674 A | 7/1991 | Hatch et al. |
| 5,198,401 A | 3/1993 | Turner et al. |
| 5,262,233 A | 11/1993 | Sudo et al. |
| 5,405,922 A | 4/1995 | DeChellis et al. |
| 5,532,066 A | 7/1996 | Latiolais et al. |
| 7,037,964 B2 | 5/2006 | Gupta et al. |
| 9,441,100 B2 * | 9/2016 | Chou .................. C08L 23/0869 |
| 2003/0021945 A1 | 1/2003 | Kelch |
| 2003/0050373 A1 | 3/2003 | Chen |
| 2005/0187315 A1 | 8/2005 | Dean |

FOREIGN PATENT DOCUMENTS

| | | |
|---|---|---|
| JP | 55-56177 A | 4/1980 |
| JP | 57-98578 A | 6/1982 |
| JP | 64-2158 B2 | 1/1989 |
| JP | 11-77939 A | 3/1999 |
| WO | 02/102898 A1 | 12/2002 |

OTHER PUBLICATIONS

Chou et al, High Flexibility EMA Made from High Pressure Tubular Process, Annual Technical Conference—Society of Plastics Engineers (2002), 60th (vol. 2), 1832-1836.

* cited by examiner

*Primary Examiner* — Sheeba Ahmed

(57) ABSTRACT

Disclosed are compositions comprising a copolymer comprising copolymerized units of ethylene and copolymerized units of a comonomer providing an amine-reactive site combined with a short chain polymer having from about 5 to 50 repeat units and containing one primary amine active amine site, which have a combination of enhanced gas transmission and absorption properties and antifog properties. Films and laminate structures comprising these compositions have excellent gas (e.g. oxygen, water vapor, etc.) absorption and transmission and antifogging properties.

18 Claims, No Drawings

ANTI-FOGGING FILMS BASED ON ETHYLENE COPOLYMER COMPOSITIONS

CROSS REFERENCE TO RELATED APPLICATION

This application claims priority under 35 U.S.C. §119(e) from U.S. Provisional Patent Application No. 61/918,711, filed Dec. 20, 2013, hereby incorporated herein by reference in its entirety.

FIELD OF THE INVENTION

This invention relates to compositions and films thereof that have antifog properties, including laminates and monolayer or multilayer structures comprising such compositions, particularly those useful for outdoor applications especially for covering greenhouses and agricultural tunnels.

BACKGROUND DISCUSSION AND RELATED ART

Greenhouses and agricultural tunnels provide environments that can be more favorable in which plants can grow. An important aspect to such structures is the covering material through which sunlight is provided to the plants inside. Various covering materials have been used including glass, rigid polycarbonate sheet, rigid polymethacrylate sheet, and flexible films. Agricultural films which are largely used in greenhouse culture or tunnel culture include soft films which are about 30 to 200 microns thick and comprise, as a base resin, polyvinyl chloride (PVC), branched low-density polyethylene (LDPE), ethylene-vinyl acetate copolymers (EVA), linear low-density polyethylene (LLDPE), etc. Of the flexible films polyvinylchloride and particularly polyethylene predominate due to low cost and adequate mechanical properties (tear resistance, elongation, etc). Weather resistance, antifogging properties, heat-retaining properties, and transparency are also particularly important for agricultural films. In addition to improvements in these properties, development of films having an extended duration of life before replacement is desired.

Polyethylene film is hazy, has reduced light transmittance and degrades rapidly under exposure to light. Even with light stabilizer additives lifetime is limited.

Acrylic films used as capping for vinyl window profiles, siding, or outdoor furniture have excellent transparency. However such films do not have adequate mechanical properties required for greenhouse or agricultural tunnel covering materials, because many acrylic films lack of flexibility and have weak tear strength. Accordingly acrylic films are typically used in films suitable for lamination on fixed substrates as protective layers (see U.S. Pat. Nos. 4,663,213, 4,141,935, 3,562,235, 3,843,753 and 3,812,205).

JP1999077939A discloses a greenhouse film made with a thermoplastic polyurethane coated on each side with a water-born coating composition containing an acrylic (co)polymer made with methylmethacrylate.

The atmosphere within greenhouses or tunnels surrounded by an agricultural film is saturated with water vapor that evaporates from the soil or plants, and the water vapor condenses on the inner surface of a cold film as small droplets that cause fogging. Water droplets on the film not only greatly reduce the incident sunlight due to irregular reflection but the droplets fall on the plants resulting in frequent occurrence of diseases.

Antifog treatments desirably prevent adhesion of water droplets to the inner surfaces of the film, thereby assuring transmission of sunlight into the greenhouse or tunnel, raising the soil temperature and air temperature within the greenhouse or tunnel, accelerating photosynthesis of the plants, accelerating healthy growth of the plants, and controlling the occurrence of plant diseases.

Currently employed antifog treatments include incorporation of an antifogging agent (antifog additive) into a film-forming ethylene resin compound and coating of an antifogging agent on a film.

Antifogging coating agents comprising an inorganic hydrophilic colloidal substance and a hydrophilic organic compound have been disclosed in JP63-45432, JP63-45717, and JP64-2158. The inorganic hydrophilic colloidal substances include colloidal silica, colloidal alumina, colloidal $Fe(OH)_2$, colloidal $Sn(OH)_4$, colloidal $TiO_2$, colloidal $BaSO_4$, and colloidal lithium silicate, with colloidal silica and colloidal alumina most generally used. Suitable hydrophilic organic compounds include various nonionic, anionic or cationic surface active agents; graft copolymers mainly comprising a hydroxyl-containing vinyl monomer unit and from 0.1 to 40% by weight of a carboxyl-containing vinyl monomer unit or a partial or complete neutralization product thereof; and sulfo-containing polyester resins.

However, an antifogging film obtained by coating a soft plastic film with an antifogging agent has not yet been employed practically as an agricultural film for the following reasons. Because of their low surface energy, soft plastic films for agricultural use generally have poor wettability and adhesion when coated with surface active agents or hydrophilic polymeric substances which have been used as antifogging agents. This tendency is particularly notable with soft ethylene resin films of low polarity such as LDPE, EVA, and LLDPE films. Therefore, when an antifogging agent is spray coated with a power atomizer onto a soft ethylene resin film, the antifogging agent needs to be used in a large quantity and this increases cost, and a large amount of time is required for spray coating operations. Further, spray coating may not provide uniform coverage, leading to insufficient antifogging effects. Where an antifogging agent is applied using a coater, etc., a large quantity of a coating is consumed, and the coating speed cannot be increased, resulting in an increase of cost. In either case, the coated antifogging coating agent is washed away together with running water droplets due to poor adhesion resulting in a very short life for the antifogging properties. Furthermore, the coated film may undergo blocking due to the stickiness of the antifogging agent. As a result, it has been impossible to retain antifogging effects in a stable manner for a long duration of at least a year or more desirably several years. Most state-of-the-art agricultural films exhibit antifogging properties for only about 1 month.

Antifogging agents commonly incorporated into the films include nonionic, anionic and cationic surface active agents.

Other methods for providing antifogging properties to agricultural films, in addition to the coating method and incorporation method, include chemical modification of the ethylene base resin or the ethylene resin film surface by introducing a polar group, such as a hydrophilic group. This technique, however, entails high cost at the present time and is difficult to apply to agricultural films.

Under these circumstances, none of the state-of-the-art polyolefin-based agricultural films satisfies the requirements of long lasting antifogging properties. Thus the market needs a greenhouse film that has high light transmittance, good physical properties, good light stability and extended lifetime.

Food products are often packaged in polymeric film for ease in handling by customers, to provide sanitary protection of the food product from the environment, to provide an easier and more economical wrapping than paper, or to provide a better view of the food product. Various polymeric materials such as polyvinyl chloride, poly(ethylene/vinyl acetate) and irradiated polyethylenes have been used in the food wrap market with plasticized polyvinyl chloride (PVC) being widely used in the market.

In the field of packaging, where polymer films are used for covering or enclosing items of sale, film clarity or good optical properties are desired. For example, freshly cut meat and vegetables are often packaged in these films, and certain properties are desired of the film for it to perform satisfactorily as a food overwrap. Film should have good "see through" clarity so the product can be viewed. High gloss is desired to add "sparkle" to the packages for aesthetic appeal to the customers.

As food products such as meats, bakery items, vegetables, fruits, and the like as are packaged, they generally experience a temperature change from where they are packaged to where they are stored or sold. This temperature change can cause the formation of water droplets on the inside surface of the film (commonly called "fog"). These water droplets are usually objectionable because they hinder the view of the food products from the consumer and can cause spoilage, particularly to certain vegetables. There is a recognized need for polymer films that resist fogging when the interior of the package contains enough moisture to produce fogging when exposed to conditions of temperature and humidity which can produce condensation on the film.

To prevent water from condensing in droplets, an antifog agent is often added to the film. The antifog agents reduce the surface tension of the water and cause the water to form a continuous sheet, which is then transparent.

There is also a perceived need in the market place for improved packaging films, especially for food products, where the widely used plasticized polyvinylchloride (PVC) requires replacement by a more acceptable film. Much of the PVC which has been used is plasticized with additives, e.g. dioctyl phthalate, which are becoming less acceptable in the market.

U.S. Pat. No. 4,189,420 discloses certain ethylene polymers blended with a polybutene and a mixed glyceride having at least one acyl group of 2 to 6 carbon atoms and at least one acyl group containing 8 to 22 carbon atoms. U.S. Pat. No. 3,048,266 discloses an antifog agent of polyethylene oxide derivative in a polyolefin composition. U.S. Pat. No. 3,048,263 discloses a polyolefin antifog agent comprising a monoglyceride of a fatty acid. U.S. Pat. No. 2,462,331 discloses the incorporation into polyethylene of polyhydric alcohol esters or metal salts of either saturated or unsaturated monocarboxylic fatty acids.

U.S. Pat. No. 5,262,233 discloses agricultural films which may have incorporated therein an antifogging agent which may be a poly(ethylene oxide) of a long chain alcohol. U.S. Pat. No. 4,486,552 discloses fog-resistant packaging films having incorporated therein (1) an alkoxylated alkyl phenol along with (or in combination with) a mixed mono-, di- and/or triglyceride, or (2) a polyoxyalkylene fatty acid ester, or (3) a combination of (2) and any part of (1) above. U.S. Pat. No. 5,001,015 discloses polyolefin films with antistatic properties which include as possible antistatic agents the reaction products of polyalkoxylates with fatty alcohols.

U.S. Patent Application Publication 2003/0050373 discloses antifogging compositions comprising potassium neutralized fatty acid modified ionomers.

U.S. Pat. No. 7,037,964 discloses polyolefin films incorporating a compound of the formula $CH_3CH_2(CH_2CH_2)_aCH_2CH_2(OCH_2CH_2)_bOH$, where a is 9 to 25 and b is 1 to 10. The polyolefin films are said to be useful as fog resistant packaging films for moist products and greenhouse films for agricultural applications.

Atmer® 502, available from Uniquema, is described in a September, 1998 data sheet as having long-lasting antifog properties in LDPE agricultural film. Atmer® 502 is a 2 mole ethoxylated stearyl alcohol, $C_{18}H_{37}(OCH_2CH_2)_2OH$.

SUMMARY OF THE INVENTION

The invention relates to articles containing a layer comprising a composition comprising:

1) a copolymer comprising copolymerized units of ethylene and copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer, wherein the amine-reactive site is present in the copolymer in an amount of from 3 to 25 weight %; in an amount of about 25 to 95 weight % of the combination of 1) and 2); and 2) a short chain polymer having from about 5 to 50 repeat units and containing one primary amine active amine site, the remainder of the side chain polymer being substantially unreactive with the amine-reactive sites of the copolymer of (b) and comprising propylene oxide, ethylene oxide, or mixture thereof; and the side chain polymer content ranges from about 5 to 75 weight % of the combination of 1) and 2); and 3) optionally from 0 to 50 weight %, based on the combination of 1), 2) and 3), of polyethylene homopolymers, polyethylene copolymers, polypropylene homopolymers or polypropylene copolymers or ethylene copolymer, different from the copolymer of 1), comprising copolymerized units of ethylene and copolymerized units of a polar comonomer selected from vinyl acetate, alkyl methacrylate, alkyl acrylate, carbon monoxide or mixtures thereof, wherein the polar comonomer is present in the copolymer in an amount from about 6 to about 40 weight %.

In a particular aspect the composition comprises an ethylene graft copolymer comprising polyetherimide segments, wherein the ethylene graft copolymer comprises, consists essentially of, or is produced from, a trunk copolymer comprising copolymerized units of ethylene, copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer; and at least one type side chain polymer linked to said reactive sites through imide linkages, said side chain polymer being derived from a short chain polymer having from about 5 to 50 repeat units and containing one primary amine active amine site, the remainder of the side chain polymer being substantially unreactive with the amine-reactive sites of the trunk copolymer and comprising propylene oxide, ethylene oxide, or mixture thereof.

An aspect of this invention is an article comprising the antifog composition described above. For example, a multilayer film comprising a layered structure comprising at least three layers including both surface layers and an intermediate layer, wherein one of the surface layers comprises the composition described above. Another example of an article of the invention is a multilayer container or package comprising a layer structure comprising at least three layers including both surface layers and an intermediate layer, wherein one of the surface layers comprises the composition described above.

DETAILED DESCRIPTION OF THE INVENTION

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Unless stated otherwise, all percentages, parts, ratios, etc., are by weight. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range starting from 0, such component is an optional component (i.e., it may or may not be present). When present an optional component may be at least 0.1 weight % of the composition or copolymer.

When the term "about" is used in describing a value or an end-point of a range, the disclosure should be understood to include the specific value or end-point referred to.

Use of "a" or "an" are employed to describe elements and components of the invention. This is done merely for convenience and to give a general sense of the invention. This description should be read to include one or at least one and the singular also includes the plural unless it is obvious that it is meant otherwise.

The term "consisting essentially of" in relation to compositions is to indicate that substantially (greater than 95 weight % or greater than 99 weight %) the only polymer(s) present in a component layer is the polymer(s) recited. Thus this term does not exclude the presence of additives, e.g. conventional film additives; i.e. each layer independently may contain conventional film additives such those described below. Moreover, such additives may possibly be added via a masterbatch that may include other polymers as carriers, so that minor amounts (less than 5 or less than 1 weight %) of polymers other than those recited may be present, wherein these minor amounts do not change the basic and novel characteristics of the invention.

As used herein, the term "copolymers" can describe polymers obtained by copolymerization of at least two different monomer species. The term "terpolymer" can be used to specifically describe a copolymer that is obtained from copolymerization of three different monomer species.

As used herein, the term "inner layer" refers to any layer of a multilayer structure whose principal surfaces are both directly adhered to other layers of the structure. The terms "outer layer", "face layer", "skin layer" and "surface layer" are used interchangeably herein to refer to any layer of a multilayer structure having only one of its principal surfaces directly adhered to another layer of the structure. All multilayer structures have two, and only two, outer layers, each of which has a principal surface adhered to only one other layer of the multilayer structure.

The term "inside layer" refers to a face layer of a multilayer structure or package that is closest to the contents of the structure or package relative to the other layers of the multilayer structure. "Inside layer" also refers to the innermost layer of a plurality of concentrically arranged layers simultaneously coextruded through a profile or annular die. For example, the term "inside layer" is used in reference to the layer that forms the surface of the inside of a container or for greenhouse films the layer that faces the controlled environment inside the greenhouse. The term "outside layer" refers to the face layer of a multilayer structure or package that is farthest from the contents relative to the other layers of the multilayer structure or package or the face layer of a greenhouse film that faces the environment outside the greenhouse. "Outside layer" also refers to the outermost layer of a plurality of concentrically arranged layers simultaneously coextruded through a profile or annular die. For example, the term "outside layer" is used in reference to the layer that forms the surface of the outside of a container.

All layers of the multilayered films, sheets and structures described herein are adhered to each other, directly or indirectly, unless otherwise specified in limited circumstances. "Directly adhered", in reference to layers, signifies that the subject layer is adhered to the object layer without an intervening tie layer, adhesive layer or other layer. "Adhered through an intervening layer" means that at least one layer, such as a tie layer or an adhesive layer, is positioned between the subject layer and the object layer.

As used herein with respect to layers of multilayered films, sheets and structures, the word "between", for example in reference to a subject layer described as being between two other specified layers, may signify the direct adhesion of the subject layer to one or both of the two other specified layers or it may signify that the subject layer is adhered to one or both of the specified layers through one or more intervening layers. In other contexts, the term "between" retains its conventional meaning, unless otherwise specified.

The compositions of this invention demonstrate useful antifog properties. This invention relates to articles in the form of films, sheets or containers, prepared from polymeric compositions which can be extruded and blown or cast to prepare films or sheets that provide antifogging performance for agriculture or packaging applications.

Articles (e.g. films or sheets) prepared from ordinary polymers have low surface hydrophilicity. In high moisture conditions, the moisture condensed on the surface of the film forms tiny water beads that scatter light and reduce the optical transparency of the film (i.e. "fogging"). In contrast, fabricated films or sheets (prepared by blown film, extrusion casting, injection molding, etc.) comprising compositions of this invention exhibit sufficient surface hydrophilicity that when exposed to high moisture conditions the moisture condensation effectively wets the surface to form surface coatings that do not scatter light. Thus, compositions of this invention demonstrate novel antifog properties compared to other polymers.

Such polymer compositions contain for example an ethylene/maleic acid monoester copolymer (E/MAME) grafted with polyetheramine to provide a graft copolymer (PEO-g-E/MAME) optionally blended with other polymers such as polyethylene (PE), polypropylene (PP) and ethylene copolymers with polar comonomers in a surface layer of the article. Most specifically this invention is a multilayer composite film for agriculture applications, such as greenhouse or agricultural tunnel films.

The film can be made by either blown film or cast film procedures. The film can reduce condensation (fog) on the inside of greenhouse films, providing better transparency, enhancing the sunlight intensity and reducing pests and diseases.

Even though the antifogging composition is based on an ethylene copolymer, its melting temperature is about 100 to 105° C., which provides good temperature resistance. High adhesion (bonding) between PEO-g-E/MAME to other polymers used in composite films, such as ethylene vinyl acetate copolymers (EVA) and PE so that multilayer films can be prepared by a number of processes, such as blown film, cast film or extrusion coating processes. Films prepared with surface layers containing the antifogging composition can be bonded or sealed together using heat sealing or radio frequency welding. Because it is a permanent antifogging system, the PEO-g-E/MAME provides good longevity for the film. The film is also recyclable.

As noted above, the first aspect of the invention is a composition comprising an antifog composition in which a polar ethylene copolymer contains a comonomer that provides an amine-reactive site selected from the group consisting of an anhydride group, a vicinal pair of carboxylic groups and a carboxylic group adjacent to an alkoxycarbonyl group.

This copolymer is obtained by copolymerization of at least ethylene and at least one comonomer capable of copolymerizing with ethylene such as an anhydride or a functional equivalent thereof, such as a vicinal pair of carboxylic groups or a carboxylic group adjacent to an alkoxycarbonyl group, wherein the alkoxy group contains up to 20 carbon atoms and the comonomer provides an amine-reactive site in the copolymer. The comonomer includes $C_4$-$C_8$ unsaturated anhydrides, $C_4$-$C_8$ unsaturated acids having at least two carboxylic groups, monoesters or diesters of $C_4$-$C_8$ unsaturated acids having at least two carboxylic groups, and mixtures thereof.

Examples of suitable comonomers include unsaturated anhydrides such as maleic anhydride, and itaconic anhydride; 1,4-butenedioic acids (e.g. maleic acid, fumaric acid, itaconic acid and citraconic acid); and $C_1$-$C_{20}$ alkyl monoesters of the 1,4-butenedioc acids, including methyl hydrogen maleate, ethyl hydrogen maleate, propyl hydrogen fumarate, and 2-ethylhexyl hydrogen fumarate. Of these, maleic anhydride, ethyl hydrogen maleate and methyl hydrogen maleate are preferred. Maleic anhydride and ethyl hydrogen maleate (EHM) are most preferred.

Preferred are copolymers of ethylene and monoalkyl maleates (also known as alkyl hydrogen maleates). As used herein, the term "ethylene/monoalkyl maleate copolymers" refers to such copolymers prepared from ethylene and a maleic acid monoester (sometimes referred to as a "half-ester", wherein one carboxyl group of the maleic moiety is esterified and the other is an unesterified carboxylic acid).

Terpolymers or tetrapolymers comprise comonomers in addition to the ethylene and amine-reactive comonomer. Preferably, the additional comonomers are less reactive to amines than the amine-reactive site comonomer. The copolymers include E/X/Y terpolymers, wherein E is ethylene; X is a monomer selected from the group consisting of vinyl acetate, and alkyl (meth)acrylates; and Y is a maleic acid monoester, including maleic monoesters of $C_1$ to $C_4$ alcohols, such as for example, methyl, ethyl, n-propyl, isopropyl, and n-butyl alcohols, wherein X is less than 15 weight %, and preferably less than 5 weight % of the terpolymer. Examples of monomers suitable for inclusion as component X are (meth)acrylic acid esters of $C_1$ to $C_4$ alcohols. For example, suitable acrylate esters include methyl acrylate and butyl acrylate and suitable alkyl methacrylate esters include methyl methacrylate and n-butyl methacrylate. Preferably, when the copolymer is a higher order polymer such as a terpolymer, the combined comonomers other than ethylene are present in about 6 to about 30 weight % of the copolymer. For such copolymers, the alcohol moiety used in the maleic acid monoester comonomer may be the same as that used in the alkyl (meth)acrylate comonomer, or it may be different.

Specific examples of the copolymer include ethylene/maleic acid monoester dipolymers such as ethylene/ethyl hydrogen maleate dipolymer, ethylene/maleic acid monoester/methyl acrylate terpolymers, ethylene/maleic acid monoester/methyl methacrylate terpolymers, ethylene/maleic acid monoester/ethyl acrylate terpolymers, ethylene/maleic acid monoester/ethyl methacrylate terpolymers, ethylene/maleic acid monoester/n-butyl acrylate terpolymers and ethylene/maleic acid monoester/n-butyl methacrylate terpolymers.

Of particular note are ethylene/alkyl hydrogen maleate copolymers wherein the alkyl group is ethyl.

The copolymer may comprise about 6 to about 25 weight % copolymerized units of the amine-reactive comonomer, based on the weight of the copolymer. Alternatively, the level of copolymerized units of the amine-reactive comonomer (for example ethyl hydrogen maleate) is from a lower limit of about 6, 8 or about 10 weight % to an upper limit of about 18, about 20, or about 25 weight based on the total weight of the copolymer.

The copolymer may have a melt index from about 5 to about 400 g/10 min., preferably about 5 or about 10 to about 100 g/min. A representative copolymer is a random copolymer having a melt index of about 5 to 100 grams/10 minutes and consisting essentially of copolymerized ethylene and a monoalkyl ester of a 1,4-butenedioic acid in which the alkyl group of the ester has 1 to 4 carbon atoms. Preferably, the trunk copolymer is a dipolymer of ethylene and about 4 to about 25 weight %, or more preferably about 8 to about 20 weight %) of ethyl hydrogen maleate (an "EMAME" copolymer). A specific polymer may comprise from about 8 to about 10 weight % of ethyl hydrogen maleate. Another specific copolymer comprises about 15 weight % of ethyl hydrogen maleate. Such copolymers are commercially available from DuPont under the tradename Fusabond®.

Ethylene/ethyl hydrogen maleate/alkyl ester terpolymers are also known. For example, a terpolymer of 46.4% ethylene, 50% methyl acylate and 3.6% of monoethyl maleate is described in U.S. Pat. No. 3,972,961. Preferably, the amount of MAME in the copolymer is from about 6 to about 20 weight % and the amount of additional comonomer (vinyl acetate, alkyl acrylate or alkyl methacrylate is less than or equal to 15 or less than or equal to 6 weight % of the terpolymer.

Preferably the EMAME copolymer or the EMAME terpolymer has a melting point higher than 80° C.

These copolymers may be synthesized by random copolymerization of ethylene and the particular comonomer(s) in a high-pressure free radical process, generally an autoclave process. For example, ethylene/monoalkyl maleate copolymers can be obtained using a suitable high-pressure process described, for example, in U.S. Pat. No. 4,351,931, the teachings therein incorporated herein by reference. Some examples of this type of ethylene/ester copolymer are described in U.S. patent Application Publication 2005/0187315.

Short Chain Polymers

The composition also comprises short chain polymers or oligomers having about 5 to 50 repeat units with one reactive end group comprising a primary amine, and the other end and/or substituent groups are substantially unreactive. Polyetheramines suitable for use as the short chain oligomer or polymer contain primary amino groups at the end of a polyether backbone. Examples of short chain polymers include polymers of organic oxides containing 2 to 16 carbon atoms, e.g., ethylene oxide, propylene oxide, 1,2-butylene epoxide, 1,4-butylene epoxide, styrene oxide, 1,2-diphenyl ethylene oxide, dioxolane, and copolymers of said organic oxides containing 2 to 16 carbon atoms, with a primary amine at one end. The average molecular weight ($M_W$) of the polyetheramine is in the range of 300 to 5000, preferably 500 to 3000.

Polyetheramines based on propylene oxide, ethylene oxide, or a mixture of both, are available commercially from Huntsman Chemical under the tradename Jeffamine®. Examples include Jeffamine® M-600 ($M_W$ approximately 600, 9/1 PO/EO ratio), Jeffamine® M-1000 ($M_W$ approximately 1000, 3/19 PO/EO ratio), Jeffamine M-2005 ($M_W$ approximately 2000, 29/6 PO/EO ratio) and Jeffamine M-2070 ($M_W$ approximately 2000, 10/31 PO/EO ratio).

The base resin polymer(s), the copolymer with amine-reactive sites and the short chain copolymer can be combined as a physical blend such as a salt and pepper pellet blend for further thermoplastic processing.

The short chain polymers can be linked to the amine-reactive sites of the copolymer of (b) to provide thermoplastic graft copolymers via the amine end as described in greater detail below.

Thermoplastic graft copolymers described herein are prepared by treating a trunk copolymer having amine-reactive sites with at least one side chain polymer having about one active primary amine site; the other groups or ends of the side chain polymer are substantially unreactive with the reactive sites on the trunk copolymer. In the final graft copolymer the trunk copolymer content ranges in an amount of about 25 to 95 weight % and the side chain polymer content ranges from about 5 to 75 weight %. The trunk copolymers contain, on a number average, about 300 to 50,000, preferably 500 to 20,000, chain atoms, and a number of amine reactive sites occurring, on the average, at a frequency of about one to 200 per 1000 chain atoms of the trunk copolymer. On the average there will be at least one active site per trunk copolymer chain. The side chain polymer will in general be shorter than the trunk copolymer, ranging in length from about 25 to 1,000 chain atoms, preferably about 30 to 300 chain atoms.

The trunk copolymers must be sufficiently stable to withstand heating during subsequent grafting of the side chain polymer. They should also be free from hydroxyl, primary amino, and secondary amino groups that can react with the amine-reactive sites to form thermostable crosslinks, which would cause a loss of the desired thermoplasticity.

The thermoplastic graft copolymer consists essentially of a trunk copolymer and a side chain polymer or oligomer wherein the trunk copolymer and the side chain polymer are preferably linked through imide linkages. The vicinal carboxylic acid groups allow formation of an imide when treated with the primary amine of the side chain polymer. When the trunk polymer is a terpolymer with an additional comonomer such as an alkyl acrylate or methacrylate, the primary amine of the side chain polymer may, depending on reaction conditions, alternatively/additionally react with the ester to provide an amide linkage.

The graft copolymers can be prepared in various ways. Convenient ways include (1) the anhydride route, for use with ethylene/maleic anhydride and other anhydride-containing trunk copolymers, and (2) the vicinal acid-acid or acid-ester route, for use with trunk copolymers having diacid or monoester of vicinal dicarboxylic acid substituents, respectively.

The anhydride route involves simply heating together with mixing the trunk copolymer having carboxylic anhydride groups, preferably maleic anhydride, and the amino-containing side chain polymer in the molten state, at a temperature from 75 to 250° C., such as about 225° C., or in solution at a temperature of 75 to 100° C. or higher. The heating temperature is above the melting point of the trunk copolymer and the amino polymer. The time of reaction, which is dependent upon the temperature and rate of mixing, can vary from about 15 seconds to 60 minutes in the melt, preferably 1 to 10 minutes. Reaction in the melt, an especially preferred procedure, can conveniently be carried out on a roll mill, in a melt extruder, or in internal mixers having convoluted rollers, sigma blades, etc., using a temperature that will give short reaction time and as many passes as necessary to insure complete reaction. Completeness of reaction can be judged by the appearance of the product, good clarity in the melt indicating essentially complete reaction. With a roll mill as the reactor, the trunk copolymer and side-chain polymer can be premixed or mixed during reaction on the mill; and because of the exposure it may be desirable to include stabilizing agents such as inhibitors or antioxidants, or to carry out the operation in a protective atmosphere such as nitrogen. With an extruder as the reactor, premixing as a dry blend is desirable.

The vicinal acid-ester route can also be carried out in the melt for reaction times similar to, but generally slower than, those for the anhydride route described above. The vicinal acid-ester route may be conducted in the same way as that described above for the anhydride route, carried out on a roll mill or in an extruder. Reaction between the polyetheramine and an EMAME copolymer proceeds well to high conversion, if the polar polyetheramine is effectively mixed with the non-polar EMAME for reaction.

The graft copolymer is believed to be obtained by attachment of the amine side chain to the backbone copolymer through imide linkages (with elimination of alcohol) which may be derived through intermediate formation of amic acids, or by prior conversion of the vicinal acid-ester by loss of alcohol to an anhydride and reaction of the latter with the amino oligomer as described above. The graft copolymer product can be characterized by several techniques, which show the presence of imide-linked side chains, the degree of polymerization of the side chains, and the chemical identity of the side chains, to name a few. Certain physical characteristics often are also helpful to show that a graft copolymer has been obtained.

Additional details of the reactions linking the trunk copolymer and the side chain polymer and means of characterizing the graft copolymer may be found in U.S. Pat. No. 3,972,961 and RE 30,754.

The process allows for control of the type and length of the polymer side chain grafted onto the trunk copolymer. From the specific type of trunk copolymer the average frequency of possible reactive graft sites can be readily determined by the fraction, e.g., on a molar basis, of monomer molecules providing the reactive sites which are polymerized into the trunk copolymer. Since the polymeric side chains are preformed prior to reacting with reactive sites on the trunk copolymer excellent control of the graft copolymer is achieved. The resultant thermoplastic graft copolymer is relatively uncontaminated with ungrafted side chain polymer, which may be a major problem in conventional free radical graft polymerization.

Incorporation of up to 20 weight % of Jeffamine M-600 or 35 weight % of Jeffamine M-1000 into an EMAME copolymer may be possible. The amount of possible polyetheramine incorporation increases for an EMAME copolymer with higher MAME content. An average of at least about three polyether segments grafted onto each EMAME polymer backbone is preferable.

Notably, the ethylene graft copolymer has a ratio of the mole % of polyetheramine added divided by the mole % of the comonomer providing an amine-reactive site in the starting trunk copolymer of about 0.1 to about 0.9, or from about 0.2 to about 0.8, or from about 0.3 to about 0.7.

The graft copolymer based on the reaction of EMAME and polyetheramine may have the ratio of the weight of polyetheramine added divided by the molecular weight of the polyetheramine versus the weight % of MAME in the starting EMAME copolymer divided by 144 of about 0.1 to about 0.9. For example, for 100 grams of EMAME (10 weight % of MAME), polyetheramine with a MW of 1000 would be incorporated into the polymer in the range of 6.9 grams to 62.5 grams. A preferred range is 0.2 to 0.8.

The advantage of this process in providing control of the side chain polymers is illustrated as follows. To provide improved properties at elevated temperatures, it may be desirable to have the side chain polymers of sufficient length so that these side chains can crystallize. For another use, it may be important that the side chain is not long enough to provide a substantial amount of crystallization at room temperature.

The graft copolymer can be prepared and then blended with an optional polymer resin described below by standard blending procedures. Blending in the melt can conveniently be carried out on a roll mill, in a melt extruder, or in internal mixers having convoluted rollers, sigma blades, etc.

Preferably, the grafting of the side chain polymer to the trunk polymer and the blending with the optional resin can be conducted in a single operation, provided the optional resin does not react with the side chain polymer. Notably, the method comprises (1) providing a trunk copolymer as described above; (2) providing a short chain polymer as described above; (3) providing an optional resin as described below; and (4) heating and mixing for about 15 seconds to 60 minutes the trunk polymer, the short chain polymer and the optional polymer, to provide a blend of the ethylene graft copolymer comprising polyetherimide segments and the optional polymer.

The blending and grafting may be conducted using a roll mill, in a melt extruder, or in internal mixers having convoluted rollers, sigma blades, etc, preferably using an extruder. For example, pellets of the base resin, trunk polymer and side chain polymer may be pre-blended to provide a salt-and-pepper blend of the three components and then melt blended in an extruder. During the extrusion, the trunk polymer and the side chain polymer can react to form the graft copolymer. Alternatively, the components may be fed from separate hoppers into the extruder to be blended and grafted.

The selectively permeable composition may further comprise an optional polymer resin that may include polyethylene homopolymers, polyethylene copolymers, polypropylene homopolymers or polypropylene copolymers. Including polyolefins such as polyethylene and/or polypropylene may provide balanced properties such as including polyethylene or polypropylene, which may provide lower cost and/or improved adhesion to low polarity materials without significantly reducing the moisture permeability properties of the blend. Inclusion of polypropylene may also provide for higher usage temperatures.

"Polyethylene" includes low density polyethylene, linear low density polyethylene, high density polyethylene or metallocene polyethylene. An ethylene-based polymer suitable as a polymeric material that can be used as the surface layer can be an ethylene homopolymer or a copolymer of ethylene and α-olefin having three or more (preferably from 3 to 12) carbon atoms that is manufactured in the presence of a metallocene catalyst (see for example U.S. Pat. Nos. 5,198,401 and 5,405,922).

Examples of the α-olefin having three or more carbon atoms in the aforementioned ethylene copolymer include propylene, 1-butene, 1-pentene, 1-hexene, 1-octene, 1-decene, 1-dodecene, 4-methyl-1-pentene, etc. In particular, a copolymer of ethylene and an α-olefin having from 3 to 12 carbon atoms is preferably used. In some cases, more than one α-olefin may be present in a mixture that can be copolymerized with ethylene.

As the polymer or copolymer of ethylene manufactured in the presence of a metallocene catalyst, those with various densities may be employed depending upon the α-olefin content in the copolymer. In general, however, it is preferable to use an ethylene copolymer having a density of from about 870 to about 970 $kg/m^3$, particularly from about 890 to about 950 $kg/m^3$, and especially from about 900 to about 940 $kg/m^3$. When processability and practical physical properties are taken into consideration, preferred is the use of a polymer having a melt flow rate, measured at 190° C. and 2160 g load, of from about 0.1 to about 100 g/10 minutes, preferably from about 0.2 to about 50 g/10 minutes.

Polar Ethylene Copolymers

Compositions of this invention may comprise an additional resin that may include at least one copolymer obtained from copolymerization of ethylene with a polar monomer (that is, a polar ethylene copolymer). Inclusion of polar ethylene copolymers may provide improved improved adhesion to polar materials. The optional polymer(s) can be present in amounts up to about 69 weight % of the base resin of, so long as they do not detract from the basic and novel characteristics of the composition and do not significantly adversely affect the desirable performance characteristics, such as high temperature resistance, adhesive properties or optical clarity of the composition.

Preferably, the ethylene copolymer comprises ethylene/vinyl acetate copolymers, ethylene/alkyl (meth)acrylate copolymers and ethylene/(meth)acrylate/carbon monoxide terpolymers and/or mixtures of any of these. Ethylene (meth)acrylate copolymers include ethylene acrylic ester copolymers and ethylene methacrylic ester copolymers.

Combinations of two or more different polar ethylene copolymers may be suitable. For example, combinations of two or more polar ethylene copolymers with different polar comonomers can be suitable, as can be combinations of two or more polar ethylene copolymers having identical monomers but with different amounts of said monomers.

Ethylene/Vinyl Acetate Copolymers

A composition of this invention may comprise at least one ethylene/vinyl acetate copolymer (an EVA copolymer), or blends thereof.

The weight percentage of vinyl acetate monomer incorporated into an EVA copolymer suitable for use herein can vary from about 2 weight percent up to about 45 weight percent or greater, based on the total weight of the copolymer. The amount of vinyl acetate can be varied to obtain a desirable degree of polarity sought for the blended composition.

The ethylene/vinyl acetate copolymer preferably has a vinyl acetate unit content of from about 6 to about 40% by weight, or from a lower limit of about 6, about 12, or about 15 weight % to an upper limit of about 20, or about 30 or about 40 weight %. The ethylene/vinyl acetate copolymer may optionally be modified by methods well known in the art, including modification with an unsaturated carboxylic acid or its derivatives, such as maleic anhydride or maleic acid. The ethylene/vinyl acetate copolymer preferably has a melt index, measured in accordance with ASTM D 1238 at 190° C., of from about 1 to about 800 g/10 minutes or from about 1 to about 400 g/10 minutes, more preferably from about 1 to about 100 g/10 minutes.

Ethylene/vinyl acetate copolymers suitable for use in this invention include those available from E. I. du Pont de Nemours & Co. (DuPont), Wilmington, Del. under the Elvax® tradename.

A mixture of two or more different ethylene/vinyl acetate copolymers can be used in the compositions for this invention in place of a single copolymer as long as the average values for the comonomer content will be within the range indicated above. Particularly useful properties may be obtained when two or more properly selected ethylene/vinyl acetate copolymers are used in blends of this invention.

Ethylene/Alkyl Acrylate Copolymers

As used herein, ethylene/alkyl (meth)acrylate copolymers include copolymers of ethylene and alkyl acrylates or alkyl methacrylates wherein the alkyl moiety contains from one to 20, preferably one to six carbon atoms. Examples of alkyl acrylates include methyl acrylate, ethyl acrylate and butyl acrylate and examples of alkyl methacrylates include methyl methacrylate, ethyl methacrylate and butyl methacrylate. "Ethylene/methyl acrylate" (EMA) means a copolymer of ethylene and methyl acrylate. "Ethylene/ethyl acrylate" (EEA) means a copolymer of ethylene and ethyl acrylate. "Ethylene/butyl acrylate" (EBA) means a copolymer of ethylene and butylacrylate. Of note are ethylene/butyl acrylate copolymers prepared from i-butyl acrylate comonomers (EiBA) and ethylene/butyl acrylate copolymers prepared from n-butyl acrylate comonomers (EnBA).

The relative amount of the alkyl (meth)acrylate comonomer incorporated into ethylene/alkyl (meth)acrylate copolymer can, in principle, vary broadly from a few weight percent up to as high as 40 weight percent of the total copolymer or even higher, such as from about 6 to about 40% by weight, or from a lower limit of about 6, about 12, or about 15 weight % to an upper limit of about 20, or about 30 or about 40 weight %. Similarly, the alkyl group can comprise from 1-carbon to 6-carbon groups, that is to say the alkyl group can vary from a methyl group up to and inclusive of branched and/or unbranched propyl, butyl, pentyl, and hexyl groups. The relative amount and choice of the alkyl group present in the alkyl (meth)acrylate ester comonomer can be used to manipulate the polarity of the composition. Preferably, the alkyl group in the alkyl (meth) acrylate comonomer has from one to four carbon atoms.

The ethylene/alkyl (meth)acrylate copolymer preferably has a melt index, measured in accordance with ASTM D 1238 at 190° C., of from about 1 to about 800 g/10 minutes or from about 1 to about 400 g/10 minutes, more preferably from about 1 to about 100 g/10 minutes. Of note is an ethylene/methyl acrylate copolymer comprising 20 weight % methyl acrylate with an MI of 8 g/10 min.

Ethylene/alkyl (meth)acrylate copolymers can be prepared by processes well known in the polymer art using either autoclave or tubular reactors. The copolymerization can be run as a continuous process in a stirred high-temperature and high-pressure autoclave reactor. For example, ethylene, the alkyl acrylate, and optionally a solvent such as methanol (U.S. Pat. No. 5,028,674) are fed continuously into a stirred autoclave such as the type disclosed in U.S. Pat. No. 2,897,183, together with an initiator.

Preferably, the ethylene copolymer is of the type that is prepared in a high pressure, tubular reactor according to the procedure described in the article "High Flexibility EMA Made from High Pressure Tubular Process" (Annual Technical Conference—Society of Plastics Engineers (2002), 60th (Vol. 2), 1832-1836). The ethylene copolymer is obtained in a tubular reactor at elevated temperature with additional introduction of reactant comonomer along the tube. However, it should be appreciated that similar ethylene/alkyl acrylate copolymeric material can be produced in a series of autoclave reactors wherein comonomer replacement is achieved by multiple zone introduction of reactant comonomer as taught in U.S. Pat. Nos. 3,350,372; 3,756, 996; and 5,532,066, and as such these high melting point materials should be considered equivalent for purposes of this invention.

Ethylene/alkyl acrylate copolymers suitable for use in this invention include those available from DuPont under the Elvaloy® AC tradename. Mixtures of two or more ethylene/alkyl (meth)acrylate copolymers are contemplated as within the scope of this invention.

The compositions used in this invention can additionally comprise optional materials commonly used and well known in the polymer art. Such materials include plasticizers, stabilizers including viscosity stabilizers and hydrolytic stabilizers, primary and secondary antioxidants, ultraviolet ray absorbers, antistatic agents, dyes, pigments or other coloring agents, inorganic fillers, fire-retardants, lubricants, reinforcing agents such as glass fiber and flakes, foaming or blowing agents, processing aids, slip additives, antiblock agents such as silica or talc, release agents, tackifying resins and/or mixtures thereof. Some suitable additives are described in the Kirk Othmer Encyclopedia of Chemical Technology, for example.

Notable stabilizer additives include antioxidants, sterically hindered amine light stabilizers, phosphites or phosphonites, hydroxylamines and hydroxyphenylbenzotriazole, hydroxybenzophenone or hydroxyphenyl-s-triazine UV absorbers.

The optional additives described above may be present in the compositions of this invention in quantities of from about 0.01 to 25 weight %, or from 0.01 to 15 weight %, or from 0.01 to 10 weight %, or from 0.01 to 5 weight %, so long as they do not detract from the basic and novel characteristics of the composition and do not have a significant adverse effect the performance properties, such as the antifog performance and adhesive properties, of the composition in the amounts used. For the avoidance of doubt, the weight percentages provided for the compositions described herein for the combination of 1), 2) and 3) do not include the presence of optional additive components, unless otherwise stipulated.

Of note are compositions that do not comprise or include low weight-average molecular weight copolyester such as described in WO2002/102898 and US2003/0021945. Inclusion of such copolyesters may unacceptably reduce the clarity of articles prepared from the composition.

The components used in the compositions can be dry blended and subsequently melt blended in a twin-screw extruder and repelletized as known in the art. For example, the blends can be prepared by melt mixing the components in a 30-mm twin-screw extruder, using a melt temperature of from 180° C. to 230° C.

Melt-blended resins of this invention can be converted by a variety of techniques and processes known to one of ordinary skill in the art. The compositions of the invention can be used in monolayer or multilayer structures to impart their antifog properties. The compositions of this invention are useful in packaging applications such as films, containers, pouches and lids. For example, the composition can be converted into a film or sheet by cast or blown film die extrusion techniques. Films and sheets can be further shaped into other forms by processes such as thermoforming, folding and heat sealing, etc.

The compositions of the invention can be used in monolayer or multilayer structures to impart their antifog properties to these structures. The compositions can be useful in packaging applications such as films, containers and lids, and in agricultural films, where antifog properties of the compositions are desirable.

For example, the composition can be coextruded with other thermoplastic polymers to provide a multilayer structure. A film of the invention can be prepared by coextrusion as follows: granulates of the various components are melted in suitable extruders and converted into a film using a converting technique. For coextrusion, the molten polymers are passed through a die or set of dies to form layers of molten polymers that are processed as a laminar flow and then cooled to form a layered structure. The film of this invention may also be made by coextrusion followed by lamination onto one or more other layers. Suitable converting techniques include blown film extrusion, cast film extrusion, cast sheet extrusion and extrusion coating. Preferably, a film of the invention is a blown film obtained through blown film extrusion.

The film of the invention can be further oriented beyond the immediate quenching or casting of the film. In general terms the process comprises the steps of coextruding a multilayer laminar flow of molten polymers, quenching the coextrudate and orienting the quenched coextrudate in at least one direction. The film may be uniaxially oriented, but is preferably biaxially oriented by drawing in two mutually perpendicular directions in the plane of the film to achieve a satisfactory combination of mechanical and physical properties.

Orientation and stretching apparatus to uniaxially or biaxially stretch film are known in the art and may be adapted by those skilled in the art to produce films of the present invention. Examples of such apparatus and processes are believed to include those disclosed in U.S. Pat. Nos. 3,278,663; 3,337,665; 3,456,044; 4,590,106; 4,760,116; 4,769,421; 4,797,235 and 4,886,634.

In a preferred embodiment of the invention, the film is oriented through a double bubble extrusion process, where simultaneous biaxial orientation may be effected by extruding a primary tube which is subsequently quenched, reheated and then expanded by internal gas pressure to induce transverse orientation, and drawn by differential speed nip or conveying rollers at a rate which will induce longitudinal orientation. More particularly, a primary tube is melt extruded from an annular die. This extruded primary tube is cooled quickly to minimize crystallization collapsed. It is then again heated to its orientation temperature (e.g. by means of a water bath). In the orientation zone a secondary tube is formed by inflation, thereby the film is radially expanded in the transverse direction and pulled or stretched in the machine direction at a temperature such that expansion occurs in both directions, preferably simultaneously; the expansion of the tubing being accompanied by a sharp, sudden reduction of thickness at the draw point. The tubular film is then again flattened through nip rolls. The film may be reinflated and passed through an annealing step (thermofixation), during which it is heated once more to adjust the shrink characteristics. For preparing flat films the tubular film can be slit along its length and opened up into flat sheets that can be rolled and/or further processed.

In other applications a composition as described herein can be directly coated onto a substrate by processes well known in the art, including, for example, extrusion lamination, extrusion coating, coextrusion lamination and coextrusion coating. These techniques involve laying down a molten curtain of the polymer onto the substrate, or between substrates moving at high speeds as they come into contact with a cold roll.

A film of this invention can be manufactured by laminating individual layers, preferably by extrusion coating, coextrusion or blow molding. Although the thickness of the whole laminate is arbitrary and dependent on its application, it is preferably from about 10 to about 3000 µm, and in particular, from about 20 to about 1000 µm, for example. To individual layers may be incorporated various additives as needed, examples of which include antioxidants, light stabilizers, ultraviolet absorbers, pigments, dyes, lubricants, antiblocking agents, inorganic fillers, etc.

Preferably, the film of the invention can be processed on the manufacturing machine at a speed higher than 50 meters per minute (m/min), and up to a speed of 200 m/min. The film of the invention is therefore compatible with high-speed machines.

The amounts and types of the components of the antifog composition can be adjusted to provide desired adhesion to the other layers of a multilayer structure. For example, the optional resin of antifog composition may comprise a large amount of nonpolar polyethylene or polypropylene and little or no optional polar copolymer if the antifog composition is to be adhered to another layer comprising nonpolar materials. Conversely, the optional resin may include larger amounts of polar ethylene copolymers if the antifog composition is to be adhered to another layer comprising more polar materials.

Of note are multilayer structures comprising a surface layer of the antifog composition and one or more layers of polyethylene homopolymers, polyethylene copolymers, polypropylene homopolymers or polypropylene copolymers or ethylene copolymer comprising copolymerized units of ethylene and copolymerized units of a polar comonomer selected from vinyl acetate, alkyl methacrylate, alkyl acrylate, carbon monoxide or mixtures thereof, wherein the polar comonomer is present in the copolymer in an amount from about 6 to about 40 weight %. The other layers may comprise polymers such as those described above for blending with the graft copolymer. When used in a multilayer film the polymers used in the antifog composition layer may be the same as or different from the polymers used in the other layers.

Of these materials, preferred are olefin-based polymers, especially ethylene-based polymers selected from ethylene homopolymers, copolymers of ethylene and α-olefin having three or more carbon atoms, and copolymers of ethylene and an unsaturated ester such as vinyl acetate and unsaturated carboxylic acid esters. There is no necessity of using virgin materials as such ethylene-based polymers. For example, when an ethylene-based polymer is used for a layer in a multilayer film, off-specification products or molding wastes such as selvages formed during molding may be recycled.

Examples of structures useful as greenhouse films include three-layer EVA films with a surface layer of the antifog composition.

They may be widely and ideally used for variety of crops, and is especially suitable for low-temperature environments.

A particular embodiment is a multilayer film comprising:

an outside layer comprising polyethylene homopolymers, polyethylene copolymers, polypropylene homopolymers or polypropylene copolymers or ethylene copolymer comprising copolymerized units of ethylene and copolymerized units of a polar comonomer selected from vinyl acetate, alkyl methacrylate, alkyl acrylate, carbon monoxide or mixtures thereof, wherein the polar comonomer is present in the copolymer in an amount from about 6 to about 40 weight %;

an inner layer comprising an ethylene copolymer comprising copolymerized units of ethylene and copolymerized units of a polar comonomer selected from vinyl acetate, alkyl methacrylate, alkyl acrylate, carbon monoxide or mixtures thereof; and an inside layer comprising the antifog composition described above.

The outside layer desirably also includes additives to protect against aging from UV exposure, etc. such as antioxidants, light stabilizers, ultraviolet absorbers. The inner layer may provide bulking for the structure and may also be useful for heat retention when used as a greenhouse film. The inside layer comprises the antifog composition and provides antifog and antidrip functions to provide better transparency, enhanced the sunlight intensity and reduction of pests and diseases.

When used as a packaging film, a multilayer structure of the invention may alternatively include polar barrier resins in addition to the antifog surface layer and other compositions described above. Such barrier resins include polyamides, ethylene vinyl alcohol copolymers (EVOH) or polyesters.

The compositions of this invention may also exhibit useful gas permeation properties and high moisture vapor transmission and absorption.

Examples

Without further elaboration, it is believed that one skilled in the art using the preceding description can utilize this invention to its fullest extent. The following Examples are, therefore, to be construed as merely illustrative, and not limiting of the disclosure in any way whatsoever. The methods for the evaluation of the raw materials used and the performances of the resulting laminates in the following Examples and Comparative Examples are shown below.

Materials Used

PEA-1: a monoamine-terminated polyether with a MW of 1000 and mole ratio between PO and EO of 3/19 obtained from Huntsman as Jeffamine® M-1000.

EMAME-1: a copolymer of 90.5 weight % ethylene and 9.5 weight % MAME, with MI of 30 as measured at 190° C.

EMAME-2: a copolymer of 85 weight % ethylene and 15 weight % MAME, with MI of 40 as measured at 190° C.

EVA-1: a copolymer of ethylene and 25 weight % of vinyl acetate, with MI of 2 as measured at 190° C.

EMA-1: a copolymer of ethylene and 20 weight % of methyl acrylate, with MI of 8 as measured at 190° C.

AOX-1: an antioxidant commercially available from CIBA-Geigy under the tradename Irganox® 1010.

AOX-2: an antioxidant commercially available from CIBA-Geigy under the tradename Irganox® 1098.

LDPE is a low-density polyethylene, available from Alathon under the designation 1640.

PP-1: polypropylene available from Dow Chemical Company under the designation DX5E98 (10 mil, 170° C. press molded film)

PE-1: linear low density polyethylene with MI of 4.8 g/10 min, (190° C., 2.16 kg) available from Nova Chemicals under the designation Sclair® 8107.

PE-2: low density polyethylene formerly commercially available from DuPont Performance Elastomers under the designation DPE1640.

Sample Preparation

All samples were made on a 26-mm twin-screw extruder, typically with 180 to 200° C. barrel temperature settings and screw speed of 100 rpm. Polymers, including EMAME-1 or EMAME-2 and optional polymers EMA-1 and LDPE when used, with an antioxidant, were fed at the back end of the extruder, followed by an intense kneading section in the extruder screw to disperse these ingredients. PEA-1 in liquid form was injected into the extruder barrel through a Katron pump with temperature setting at 50° C. after the initial mixing section, and this liquid injection was followed by additional intense mixing elements. The melt strand from the extruder was water quenched and cut into pellets for collection and subsequent evaluation.

Table 1 summarizes the materials prepared by melt blending the components listed as parts by weight. Examples 1 to 8 are blends of EMAME copolymers containing varied amounts of PEA-1 to form graft copolymers.

Table 1 lists two blend examples. Example 9 is a blend of EMAME and EMA-1 (70/30 weight %) with 28 weight % of PEA-1. Antioxidant AOX-1, 0.1 weight %, was included. The sample was produced in a W/P extruder in one step. Example 10 is a blend of 40 weight % of LDPE and 60 weight % of a polyethyleneamine-grafted EMAME. The grafted component of Example 10 was prepared from 100 parts by weight of EMAME-2 and 40 parts by weight of PEA 2 and AOX-2, 0.1 weight %, prepared separately in a W/P extruder. The graft copolymer had a melting point of 100.7° C. In essence, Example 10 was prepared in two steps by first making the polyetheramine-grafted E/MAME and then blending with LDPE.

To illustrate moisture permeance associated with a film layer, blown films were prepared from the materials listed in Table 2. All samples were made into blown films easily. The films, approximately 1 to 3 mils in thickness, were made using a small laboratory scale blown film line.

The materials were characterized by the following methods.

Melt Index and Melting Point

Melt index (MI) is the mass rate of flow of a polymer through a specified capillary under controlled conditions of temperature and pressure. It was measured according to ASTM 1238 using a 2160 gram weight at 190° C.

Melting points of the samples were measured using a differential scanning calorimetry (DSC). All samples showed a melting point at about 103 to 108° C. Thus, the samples all have good temperature resistance.

Moisture Vapor Permeation Values and Moisture Vapor Transmission Rate

The water vapor transmission tests were conducted on a Mocon PERMATRAN-W 101K, following ASTM D6701-01, at 37.8° C. at 100% relative humidity. Moisture vapor permeation values (MVPV) on single layer film samples are reported in g-mil/m$^2$-24 h while MVTR on laminates are reported in g/m$^2$-24 h.

Fogging Test

The films are tested for their ability to resist fogging by condensation. A styrofoam cup is filled with near boiling hot water to about 75% of the volume. The test film is placed over the cup and after a short period of time a visual examination of the film determines whether the film was fogged by condensation. Films that are not fogged are indicated as "antifog."

Adhesion to Other Polymers

The adhesion strength between the Examples listed in Table 3 and other polymers, namely, PE-1, PE-2, and PP, was measured as follows. Press molded films of 10 mil of PE and PP were prepared. Then the sandwich samples of the press molded film and the cast film of the Examples were pressed molded at condition indicated in Table 3. For example, a sandwich laminate of PE-1 (molded film)/Example 11 (cast film)/PE-1 was laminates at 150° C. for 60 sec. The laminates with PE-1 and PE-2, the sandwich laminates were prepared at 150° C. for 60 sec. For laminates with PP, the sandwich laminates were prepared at 190° C. for 30 sec. The peel strength strips of the laminates were tested for adhesion reported in (lbf/in) in an INSTRON (90 degree peel test; at a speed of 50 mm/minute).

In the Tables below, "CNP stands for "could not peel" and NA stands for "not available".

TABLE 2

| | Example | | | | |
|---|---|---|---|---|---|
| | 11 | 12 | 13 | 14 | 15 |
| | Parts by weight | | | | |
| EMAME-1 | 20 | | | | |
| EMAME-2 | | 30 | 40 | 60 | 20 |
| EMA-1 | 80 | 70 | 60 | 40 | 80 |
| LDPE | | | | | |
| PEA-1 | 4 | 8 | 12 | 18 | 6 |
| Melt Index (g/10 min) | 5.7 | 4.9 | 4.9 | 5.1 | 3.0 |
| Cast film (mm) | 0.32 | 0.32 | 0.39 | 0.33 | 0.40 |
| | Adhesion to other polymers (lbf/in) | | | | |
| PE-1 | 6.24 | 5.99 | CNP | CNP | CNP |
| PE-2 | 5.83 | 6.44 | 7.01 | CNP | CNP |
| PP-1 | 3.06 | NA | 3.63 | 4.15 | NA |

The data in Table 2 demonstrate that Examples 11 through 12, despite high polarity, still provide excellent adhesion to other, nonpolar substrates. This is important for end use applications, where in most cases are in multilayer structure form. It is important that the material of high polarity can be adhered to polymers of other layers either by coextrusion, lamination or extrusion coating. This invention provides blends that are able to adhere to polyolefin substrates despite their high polarity. Even with high polarity components, the blends still retain the chemical and physical nature of the polyethylene portions of the polymers.

What is claimed is:

1. An article comprising an antifogging composition comprising:
   1) a copolymer comprising copolymerized units of ethylene and copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer, wherein the copolymerized units of the comonomer providing the amine-reactive site are present in the copolymer in an amount of from 3 to 25 weight %, based on the weight of the copolymer; and

TABLE 1

| | Parts by weight | | | | | | | | | |
|---|---|---|---|---|---|---|---|---|---|---|
| | 1 | 2 | 3 | 4 | 5 | 6 | 7 | 8 | 9 | 10 |
| EMAME-1 | | | | | 100 | 100 | 100 | 100 | 70 | 43 |
| EMAME-2 | 100 | 100 | 100 | 100 | | | | | | |
| EMA-1 | | | | | | | | | 30 | |
| LDPE | | | | | | | | | | 40 |
| PEA-1 | 30 | 35 | 40 | 45 | 30 | 35 | 40 | 24.5 | 28 | 17 |
| AOX-1 | 0.1 | 0.1 | 0.1 | 0.1 | 0.1 | 0.1 | 0.1 | 0.1 | 0.1 | |
| AOX-2 | | | | | | | | | | 0.06 |
| Melt Flow Index | 5.9 | 4.3 | 4.7 | 5.3 | 4.5 | 4.2 | 4.2 | 6.7 | 4.0 | 5.0 |
| DSC Melting point (° C.) | 104 | 103 | 103.6 | 103.4 | 106.4 | 105.7 | 106.2 | 108 | 102.5 | 108 |
| | Blown Film | | | | | | | | | |
| Thickness (mil) | 1 | 2.3 | 2.3 | 1.85 | 1.8 | 1.8 | 2.4 | 2.3 | 2.0 | 2.2 |
| | MVPV (g-mil/m$^2$-24 h) | | | | | | | | | |
| dry | 1490 | 3472 | 3018 | 3763 | 2270 | 2732 | 4097 | 2945 | 1865 | 1510 |
| dry | 1705 | 3116 | 2953 | 3863 | 2290 | 3096 | 4506 | 2729 | | |
| water treated | 1383 | 2775 | 3610 | 3610 | 1853 | 2560 | 3523 | 2203 | | |
| water treated | 1342 | 2560 | 3845 | 3532 | 2010 | 2586 | 3835 | 2160 | | |

2) a short chain polymer having from about 5 to 50 repeat units and containing one primary amine, the remainder of the short chain polymer being substantially unreactive with the amine-reactive sites of the copolymer and comprising copolymerized units of propylene oxide, ethylene oxide, or a mixture thereof; and 3) optionally polyethylene homopolymers, polyethylene copolymers, polypropylene homopolymers or polypropylene copolymers or ethylene copolymers, different from the copolymer, comprising copolymerized units of ethylene and copolymerized units of a polar comonomer selected from vinyl acetate, alkyl methacrylate, alkyl acrylate, carbon monoxide or mixtures thereof, wherein the copolymerized units of the polar comonomer are present in the ethylene copolymer in an amount from about 6 to about 40 weight %, based on the weight of the ethylene copolymer;

wherein the amount of the copolymer is about 25 to 95 weight %, based on the the combination of 1) and 2); the amount of the short chain polymer is from about 5 to 75 weight %, based on the combination of 1) and 2); and the amount of the polyethylene homopolymers, polyethylene copolymers, polypropylene homopolymers, polypropylene copolymers or ethylene copolymers is from 0 to 50 weight %, based on the combination of 1), 2) and 3).

2. The article of claim 1 wherein the composition comprises an ethylene graft copolymer comprising polyetherimide segments, wherein the ethylene graft copolymer comprises a trunk copolymer comprising copolymerized units of ethylene, copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer; and at least one type side chain polymer linked to said reactive sites through imide linkages, said side chain polymer being derived from a short chain polymer having from about 5 to 50 repeat units and containing one primary amine active amine site, the remainder of the side chain polymer being substantially unreactive with the amine-reactive sites of the trunk copolymer and comprising propylene oxide, ethylene oxide, or mixture thereof.

3. The article of claim 1 that is a monolayer film or a multilayer film comprising a surface layer comprising the antifogging composition.

4. The multilayer film of claim 3 comprising one or more layers of polyethylene homopolymers, polyethylene copolymers, polypropylene homopolymers or polypropylene copolymers or ethylene copolymers, different from the copolymer, comprising copolymerized units of ethylene and copolymerized units of a polar comonomer selected from vinyl acetate, alkyl methacrylate, alkyl acrylate, carbon monoxide or mixtures thereof, wherein the polar comonomer is present in the ethylene copolymer in an amount from about 6 to about 40 weight %.

5. The multilayer film of claim 4 comprising at least three layers including both surface layers and an intermediate layer, wherein one of the surface layers comprises the antifogging composition.

6. The multilayer film of claim 4 comprising an outside surface layer comprising polyethylene homopolymers, polyethylene copolymers, polypropylene homopolymers or polypropylene copolymers or ethylene copolymer comprising copolymerized units of ethylene and copolymerized units of a polar comonomer selected from vinyl acetate, alkyl methacrylate, alkyl acrylate, carbon monoxide or mixtures thereof, wherein the polar comonomer is present in the copolymer in an amount from about 6 to about 40 weight %;

an interior layer comprising an ethylene copolymer comprising copolymerized units of ethylene and copolymerized units of a polar comonomer selected from vinyl acetate, alkyl methacrylate, alkyl acrylate, carbon monoxide or mixtures thereof; and an inside surface layer comprising the antifogging composition.

7. An article according to claim 3 in which the monolayer film or the multilayer film is a greenhouse film.

8. An article according to claim 3 in which the monolayer film or the multilayer film is a food packaging film.

9. A process for preparing the composition of claim 2, said process comprising the steps of:
(1) providing the copolymer;
(2) providing the short chain polymer;
(3) providing the optional polymer selected from the group consisting of polyethylene homopolymers, polyethylene copolymers, polypropylene homopolymers, polypropylene copolymers and ethylene copolymers;
(4) heating and mixing the copolymer, the short chain polymer, and the optional polymer for about 15 seconds to about 60 minutes, to provide a blend of the ethylene graft copolymer and the optional polymer.

10. The process of claim 9, wherein the base resin, the copolymer and the short chain polymer are heated and melt blended at a temperature of from 180 to 230° C.

11. The process of claim 9, wherein the base resin, the copolymer and the short chain polymer are heated and mixed in solution at a temperature of 75 to 100° C. or higher.

12. The article of claim 1, wherein the antifogging composition comprises a thermoplastic graft copolymer that is the reaction product of the amine-reactive sites of the copolymer and the primary amines of the short chain polymer.

13. The article of claim 12 that is a film container, pouch or lid having a monolayer structure or a multilayer structure.

14. The article of claim 13 that is a multilayer film comprising at least one layer comprising the antifogging composition and at least one additional layer.

15. The multilayer film of claim 14, wherein a surface layer comprises the antifogging composition; and the at least one additional layer comprises polyethylene homopolymer, polyethylene copolymer, polypropylene homopolymer or polypropylene copolymer; or ethylene copolymer comprising copolymerized units of ethylene and copolymerized units of a polar comonomer selected from the group consisting of vinyl acetate, alkyl methacrylate, alkyl acrylate, carbon monoxide, and mixtures of two or more of vinyl acetate, alkyl methacrylate, alkyl acrylate, and carbon monoxide.

16. The multilayer film of claim 14, wherein at least one layer comprises a polar barrier resin.

17. The multilayer film of claim 16, wherein the polar barrier resin comprises polyamide, ethylene vinyl alcohol copolymer or polyester.

18. The multilayer film of claim 14 comprising:
an outside surface layer comprising polyethylene homopolymers, polyethylene copolymers, polypropylene homopolymers or polypropylene copolymers or ethylene copolymers comprising copolymerized units of ethylene and copolymerized units of a polar comonomer selected from vinyl acetate, alkyl methacrylate, alkyl acrylate, carbon monoxide or mixtures thereof, wherein the polar comonomer is present in the copolymer in an amount from about 6 to about 40 weight %;

an inner layer comprising an ethylene copolymer comprising copolymerized units of ethylene and copolymerized units of a polar comonomer selected from vinyl acetate, alkyl methacrylate, alkyl acrylate, carbon monoxide or mixtures thereof; and an inside layer comprising the antifogging composition.

* * * * *